Nov. 30, 1965     E. I. FULLER     3,220,670
HELICOPTER
Filed April 15, 1964     4 Sheets-Sheet 1
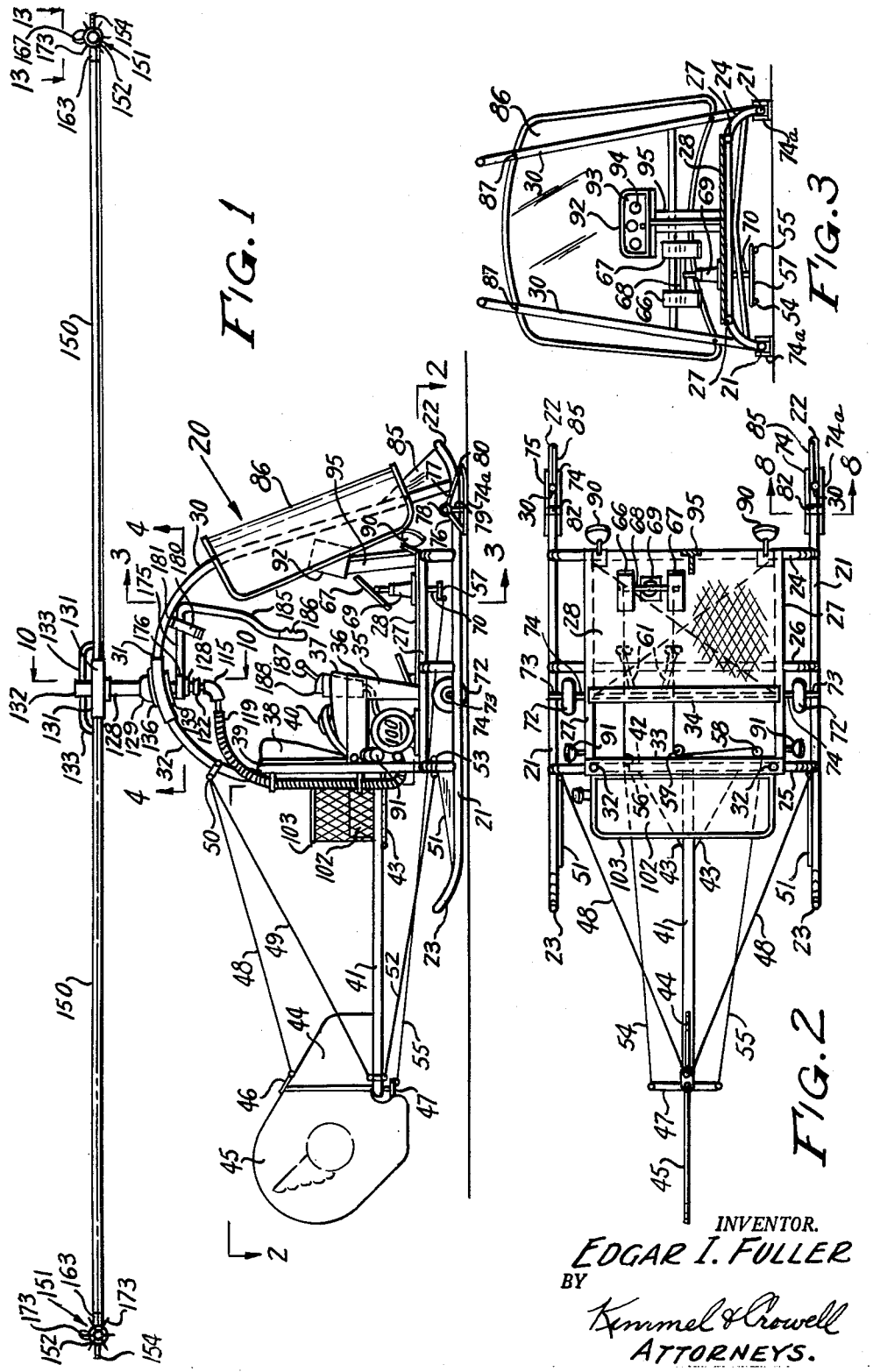
INVENTOR.
EDGAR I. FULLER
BY
Kimmel & Crowell
ATTORNEYS.

Nov. 30, 1965   E. I. FULLER   3,220,670
HELICOPTER
Filed April 15, 1964   4 Sheets-Sheet 2

INVENTOR.
EDGAR I. FULLER
BY
Kimmel & Crowell
ATTORNEYS.

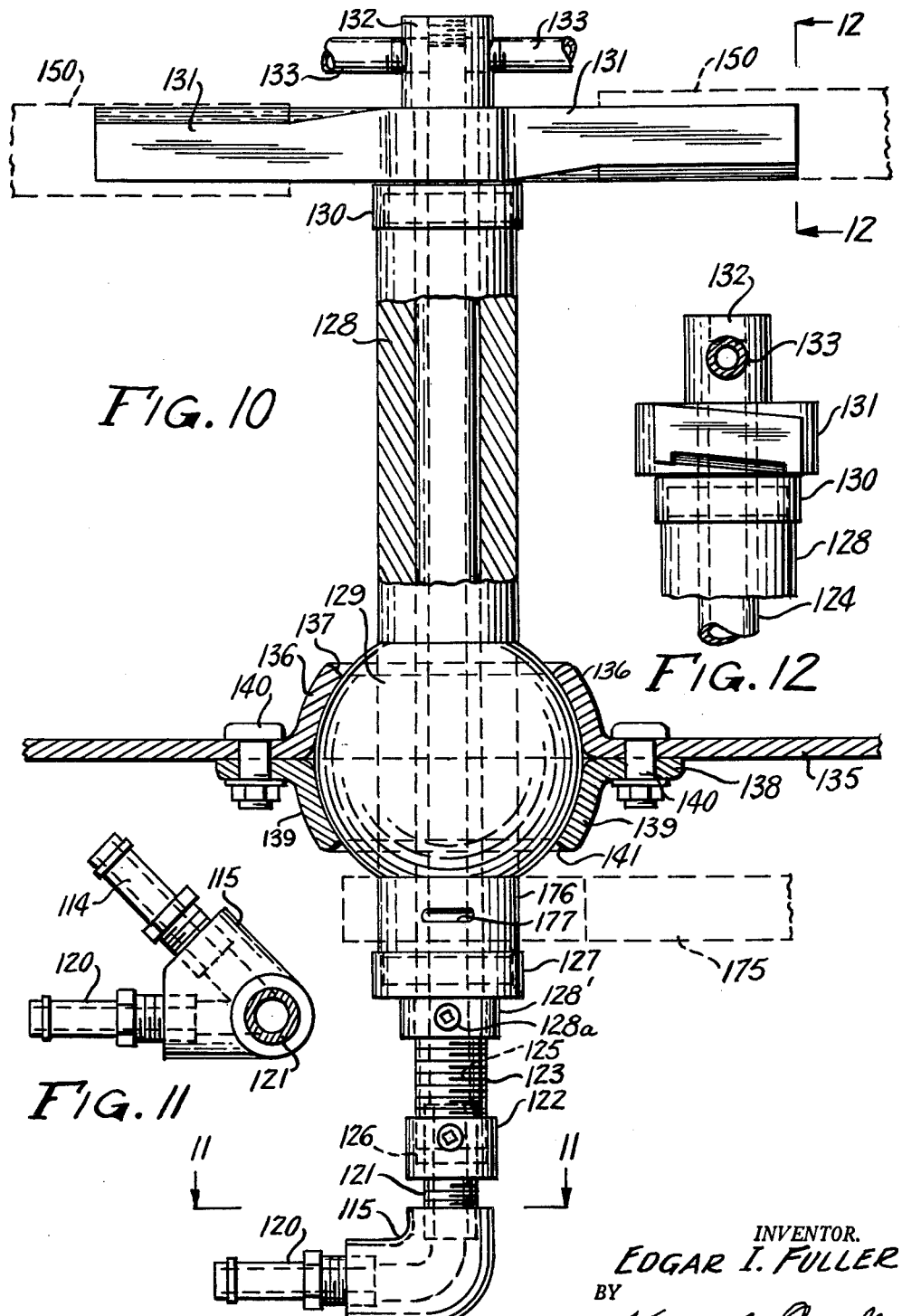

Nov. 30, 1965 E. I. FULLER 3,220,670
HELICOPTER
Filed April 15, 1964 4 Sheets-Sheet 4
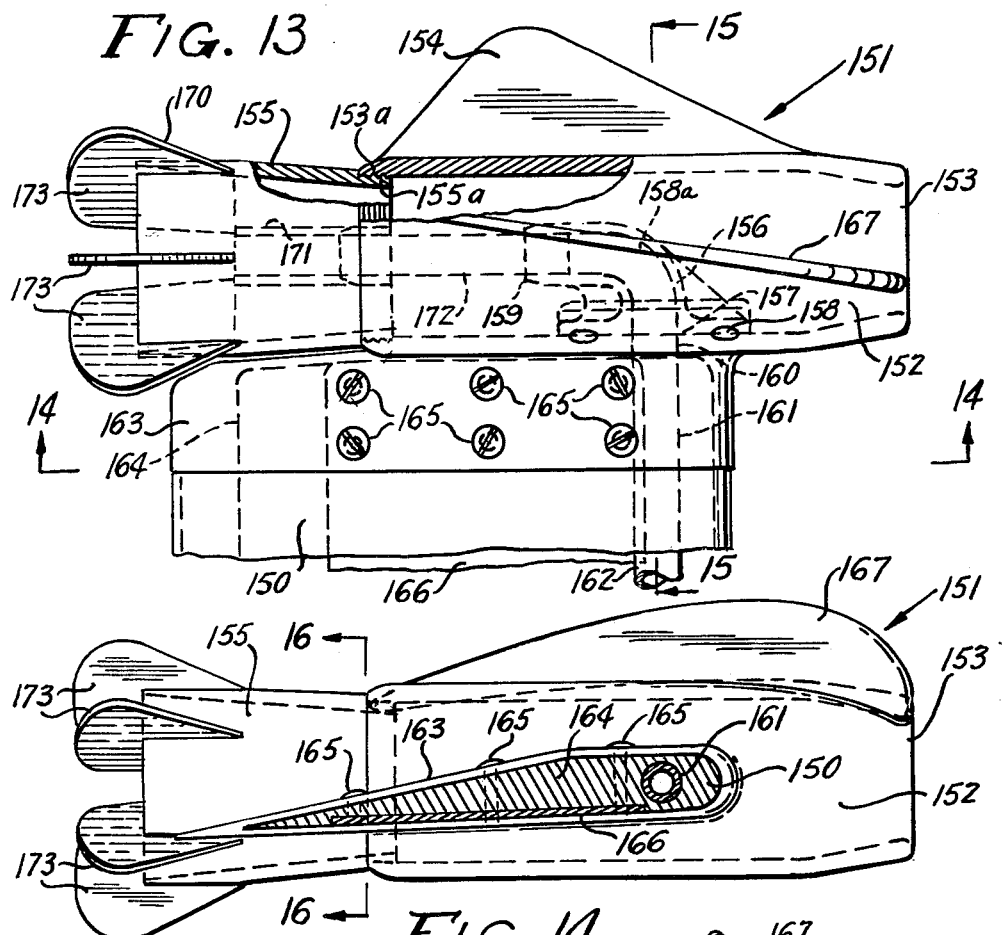
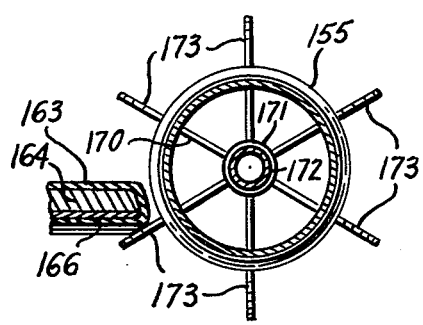
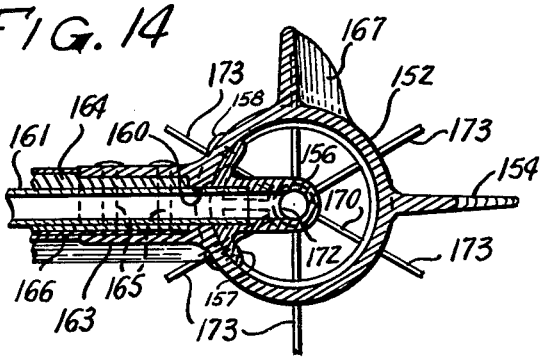
INVENTOR.
EDGAR I. FULLER
BY
Kimmel & Crowell
ATTORNEYS.

United States Patent Office 3,220,670
Patented Nov. 30, 1965

3,220,670
HELICOPTER
Edgar Irvin Fuller, Lacey, Wash., assignor to
U.S. Aviation Corporation, Seattle, Wash.
Filed Apr. 15, 1964, Ser. No. 359,884
11 Claims. (Cl. 244—17.17)

This invention relates to a helicopter, and more particularly to a light helicopter which is driven exclusively by means of compressed air expelled through Coanda venturi type jets mounted on the rotor tips.

A primary object of this invention is the provision of an improved helicopter characterized by extreme simplicity and lightness of construction which is driven entirely by compressed air which is compressed in the vehicle by means of a compressor and a relatively low horsepower motor and expelled through Coanda venturi type jets mounted on the extreme tips of the rotors, thus substantially eliminating excessive torque on the drive shaft, and materially reducing the power requirements for a given lift.

An additional object of the invention is the provision of such a helicopter wherein, due to the jet propulsive effect, the maximum turbulence created by the blades is concentrated on the outer two-thirds thereof, whereby the center of the rotor creates a calm central portion, which extends over the cockpit of the craft, the outer down draft created by the ends of the blades forming a shield, obviating the necessity for a bubble type or other protective enclosure for the cockpit.

A further object of the invention is the provision of such a helicopter provided with a relatively short tail structure, which lies within the span of the rotor blades, and means associated with the rudder construction which prevent whipping of the tail due to the rotor down draft, and consequent breakage of the control cables.

A further object of the invention resides in the provision of such a helicopter which is extremely light in construction, and which may be operated with a minimum of power, and consequent minimum of fuel.

A further object of the invention is the provision of a helicopter of this character which is extremely simple in operation, and which is provided with a minimum of control components.

Still another object of the invention is the provision of a helicopter of this nature provided with means for automatically cutting out the motor when the compression achieved by the compressor reaches a predetermined factor, so that the device may fly on pressure induced by and maintained in the compressor alone for limited periods without continuous additional compression by the motor.

Still another object of the invention is the provision of a device of this character having improved and simplified means for directing the air from a compressor to the tips of the rotor blades, and for amplifying the effective pressure created thereby, by a Coanda venturi arrangement at the rotor tips.

A still further object of the invention is the provision of such a helicopter which is extremely stable in flight, which will hover at a given spot at low speeds with a minimum of stress, which provides a relatively high safety factor in that the craft is substantially self landing due to autorotation of the rotor blades with or without power, which has a relatively long range, with a minimum of fuel consumption, which is sturdy and durable in construction, reliable and efficient in operation, and extremely inexpensive to manufacture.

Still other objects reside in the combinations of elements, arrangements of parts, and features of construction, all as will be more fully pointed out hereinafter and disclosed in the accompanying drawing wherein there is shown a preferred embodiment of this inventive concept.

In the drawing:

FIGURE 1 is a side elevational view of one form of helicopter embodying elements of the instant inventive concept.

FIGURE 2 is a sectional view taken substantially along the line 2—2 of FIGURE 1 as viewed in the direction indicated by the arrows.

FIGURE 3 is a sectional view taken substantially along the line 3—3 of FIGURE 1 as viewed in the direction indicated by the arrows.

FIGURE 10 is an enlarged fragmentary sectional view taken substantially along the line 10—10 of FIGURE 1 as viewed in the direction indicated by the arrows.

FIGURE 11 is a sectional view taken substantially along the line 11—11 of FIGURE 10 as viewed in the direction indicated by the arrows.

FIGURE 12 is a sectional view taken substantially along the line 12—12 of FIGURE 10 as viewed in the direction indicated by the arrows.

FIGURE 13 is a plan view, partially broken away, showing one of the rotor tip jets taken substantially along the line 13—13 of FIGURE 1.

FIGURE 14 is a sectional view taken substantially along the line 14—14 of FIGURE 13 as viewed in the direction indicated by the arrows.

FIGURE 15 is a sectional view taken substantially along the line 15—15 of FIGURE 13 as viewed in the direction indicated by the arrows; and FIGURE 16 is a sectional view taken substantially along the line 16—16 of FIGURE 14 as viewed in the direction indicated by the arrows.

Similar reference characters refer to similar parts throughout the several views of the drawings.

Figure 5:
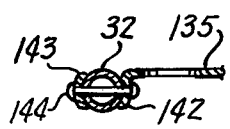
FIGURE 5 is an enlarged sectional view taken substantially along the line 5—5 of FIGURE 4 as viewed in the direction indicated by the arrows.

Having reference now to the drawings in detail, the helicopter of the instant invention is generally indicated at 20, and is comprised of a frame which includes a pair of longitudinally extending tubular bottom members 21, which are upturned at their forward ends as at 22, and similarly upturned at the rear ends at 23. The longitudinally extending members 21 are connected by transversely extending frame members which include a front member 24, a rear member 25, and a central base member 26. Each of members 24, 25, and 26 are generally arcuate in configuration, as best seen in FIG. 3, and provide a raised portion along which extend longitudinal parallel frame members 27, which serve as a support for a floor plate 28, which is preferably comprised of foraminous material, of sufficient strength to support the occupants, and at the same time of relatively light construction.

Arcuate tubular uprght members 30 extend upwardly from the forward ends of members 21 and are secured to the apices of arcuate rear members 32, which extend downwardly and divergingly rearwardly to the rear transverse supporting member 25, completing the basic component frame construction. A rotor mounting plate 31 is secured to members 32 adjacent their point of juncture with members 30, in a manner to be more fully described hereinafter.

A pair of relatively heavy transversely extending supporting members 33 and 34 extend across the frame between the members 27 and are rigidly secured thereto rearwardly of the grid 28. Uprights 35 extend from the opposite ends of frame member 34 and serve as a support for a seat frame 36, which carries a seat 37 having a back 38 which is supported by a back frame 39 secured along its sides to the lower portions of frame members 32. Suitable conventional safety straps 40 are provided and appropriately secured to opposite portions of the seat frame 36.

A tail boom 41 extends rearwardly from a transverse frame member 42 which extends between the upright members 32 and is securely affixed thereto at the back of the seat frame 36. Supporting and reinforcing plates 43 of generally triangular configuration are secured to the transverse support 42 and the boom 41 for support thereof. At the outer end of boom 41 there is provided a vertical fin 44 to which is pivotally secured a rudder 45, the rudder including a rudder post 46 to the underside of which is fixed a transverse rudder bar 47. Reinforcing guy wires 48 and 49 extend from suitable clips 50 secured to the frame members 32 to the outer end of tail boom 41, as best seen in FIGS. 1 and 2 for reinforcing purposes. Triangular stabilizing fins 51 also extend along the rear portions of longitudinal frame members 21 from the extremities of the downwardly extending ends of arcuate rear transverse frame members 32. Additional guy wires 52 also extend from the outer end of tail boom 41 to the lower extremities of frame members 32 and are suitably secured thereto by means of fasteners 53.

Figure 7:
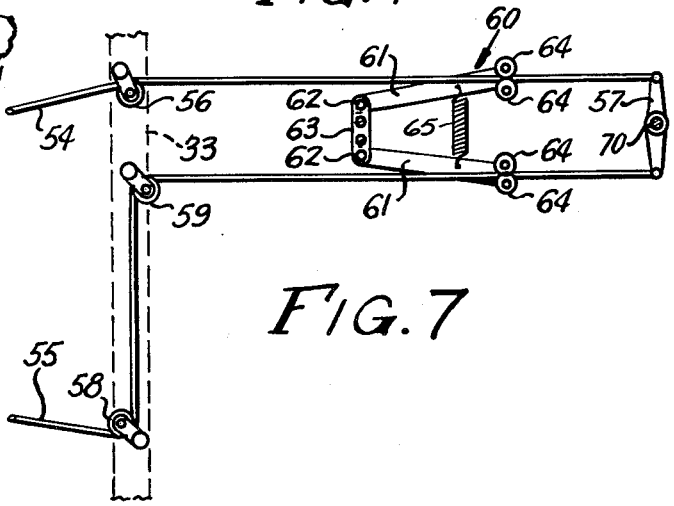
FIGURE 7 is a fragmentary bottom plan view showing a constructional detail.

Control of the rudder 45 is effected by a pair of oppositely disposed control cables 54 and 55 which are connected, respectively, to the opposite ends of rudder bar 57. As best shown in FIG. 7, control cable 54 extends over a pulley 56 carried by the underside of frame member 33 to one end of a rudder control bar 57. The cable 55 extends over a first pulley 58 secured to the underside of frame member 33 and thence over a second pulley 59 to extend in parallelism to the other end of rudder control bar 57. A tensioning device is generally indicated at 60 and comprises a pair of arms 61 which are pivotally mounted as on pivots 62 to a support 63 which is rigidly secured to the floor of grid 28. At their free ends each of members 61 has a pair of opposed pulleys 64, between each pair of which one of control cables 54 and 55 extends. A relatively heavy coil spring 65 extends between the arms 61 at an intermediate point, the arrangement being such that any flexure of the tail boom 41 resulting in a tensioning of one or the other of cables 54 or 55 will be automatically compensated by the biasing of its associated arm 61 outwardly, while any slack in the opposite cable is automatically taken up. By virtue of this arrangement any whipping of the tail assembly occasioned by down draft from the rotor is compensated, so that the danger of control cable breakage is substantially eliminated.

Control of the rudder control bar 57 is effected by means of a pair of pedals 66 and 67 mounted on a bar 68 which extends upwardly through a fitting 69 on the floor grid 28. A control rod 70 depends through the fitting 69 from the transverse shaft 68 and is fixed centrally to the rudder control bar 57 so that movement of either pedal 66 or 67 controls the associated cable 54 or 55 to turn the rudder.

Figure 8:
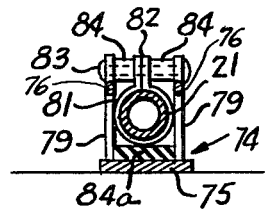
FIGURE 8 is an enlarged sectional view taken substantially along the line 8—8 of FIGURE 2.
Figure 9:
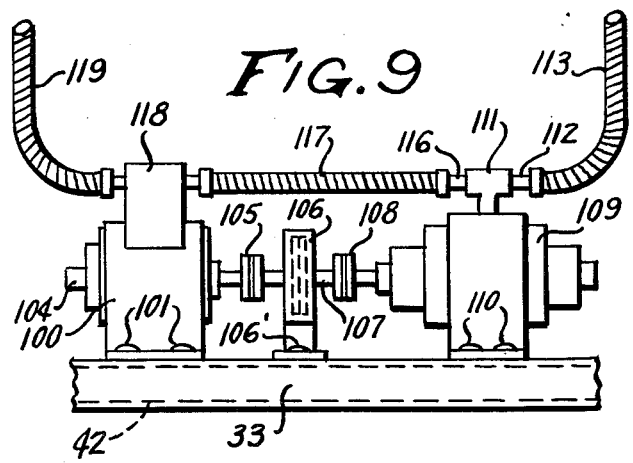
FIGURE 9 is an enlarged fragmentary sectional view, partially schematic, taken substantially along the line 9—9 of FIGURE 1 as viewed in the direction indicated by the arrows.

Suitable rubber tired landing wheels 72 are provided beneath the frame members 21, and are mounted on a transverse axle 73 which is carried by depending struts 74 which extend from the underside of frame members 27. In order to protect the tip portions 22 of frame members 21, landing skids 74a are also provided. The skids 74a comprise lannding plates with angularly disposed strut members 76 and 77 extending from the opposite ends thereof upwardly to a hub 78. Central substantially vertical struts 79 are also provided and the tips of the skid 74a are upwardly turned as at 80 (see FIG. 1). The struts are adapted to be mounted on the bars 21 by means of collars 81 which are provided with split lugs 82 through which extends a shaft or bolt 83, suitable spacing collars 84 being provided, as best shown in FIG. 8 on opposite sides of the lugs 82. A rubber cushion member 84a is positioned between the top of skid plate 74a and the underside of frame member 21 and serves as a cushioning effect to protect the front end of the frame members 21 during landing.

Triangular stabilizing plates or fins 85 are also positioned at the front of the device, and extend upwardly from the upturned tips 22 of the members 21 to the adjacent portions of the arcuate upwardly extending frame members 30.

A suitable plastic or other wind screen 86 is also provided and suitably secured as by rivets or bolts 87 to the front frame members 30.

Landing lights 90 are mounted on transverse front bar 24, and running lights 91 are carried by the sides of seat frame 36. The lights are supplied with power from a suitable battery which may be mounted in any convenient location as, for example, in an instrument box 92, which is provided with an instrument panel 93, and which carries any suitable conventional instrumentation 94, in accordance with the local requirements for helicopter instruments. Such instruments may include an altimeter, a turn and bank indicator, a wind speed indicator, or any other desired instruments which may be considered appropriate or which are required by local or national regulations or laws. The instrument box 92 is supported on a standard 95, which extends upwardly a suitable distance from the floor grid 28 and is centrally located for the convenience of both the pilot and passenger of the helicopter.

The space between the seat frame 36 and the supporting members 33 and 34 is occupied by the power and propulsive units of the instant invention. Such units comprise a gasoline motor 100, which is of relatively low horsepower, it having been found by experimentation that a 7½ H.P. motor is adequate for the purposes of the instant invention, and a compressor. The motor is suitably secured to the frame as by means of bolts 101, and is supplied with fuel from a fuel tank 102, which is suitably mounted in a basket or luggage carrier 103 which is secured to the rear of the frame behind the seat back support 39.

The motor 100 is provided with a drive shaft 104 which extends through a suitable coupling 105 to a conventional friction clutch mechanism 106 which is also mounted as by means of bolts 106' to the frame members 33 and 34. From the clutch 106 a shaft 107 leads through a coupling 108 to a compressor 109 which is mounted by bolts 110 on the frame members 33 and 34.

Any desired type of compressor may be employed, although the particular compressor shown in my application Serial No. 59,675, filed September 30, 1960, entitled, Compressor, now abandoned, has been found particularly suitable, achieving an extremely high compression factor in comparison with the power of motor 100. Such a compressor is provided with an air inlet, not shown in the drawings, which draws air in from the ambient atmosphere, and compresses it to a high degree and passes the air through an outlet 111 in the form of a T. From one leg of the T 111 a fitting 112 is connected to a flexible conduit 113, which extends to the plastic fitting 114 which comprises one leg of a V coupling 115.

From the other leg of the T fitting 116 a conduit 117 leads to a heater 118, which includes a conventional venturi (not shown) for drawing heat from motor 100 to heat air passed from the compressor to prevent icing of the rotor tips, to be more fully described hereinafter. From heater 118 a conduit 119 extends to the other leg 120 of V coupling 115. The coupling 115 comprises an elbow in the vertical portion of which is threaded a tubular member 121, which carries a swivel fitting 122. The fitting 122 has rotatably mounted therein the threaded end 123 of a rotatable hollow tubular member 124, which includes an internal air passage 125, from which the combined normal and heated air from the conduits 113 and 119 passes. The swivel fitting 122 may contain the usual graphite thrust bearing 126. The tubular member extends through a thrust bearing 127, which is secured in place by means of a lock nut 128' and a set screw 128a into a hollow, relatively heavy aluminum tube 128 which is provided with a ball fitting 129 which serves as a universal joint to permit the swivelable movement, in a manner to be described more fully hereinafter, of the tube 128 and its associated mechanism. The upper end of rotatable tube 124 extends outwardly through a thrust bearing 130, and carries a pair of oppositely disposed rotor blade mounting arms 131. Above the mounting arms 131 the top of tube 124 is closed as at 132 and a pair of oppositely disposed flexible air tubes 133 extend outwardly through the rotor blades in a manner to be more fully described hereinafter.

Referring back to FIG. 4 and the mounting member 31, it will be seen that the same is positioned adjacent the connection of the forward members 30 and the rear frame members 32, and comprises a triangular plate 135, which includes a central opening surrounded by an upwardly extending arcuate circular flange 136 which surrounds the upper half of the ball 129 leaving an opening 137 in which the upper portion of the tube 128 may swivel. A lower flange member 138 having a lower circular arcuate flange 139 is bolted or riveted to the plate 135 as by means of bolts or rivets 140, a lower opening 141 being provided in which the lower portion of the tube 128 may also swivel in a universal manner.

Figure 4:
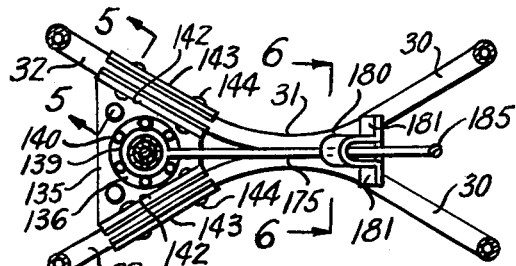
FIGURE 4 is a fragmentary enlarged sectional view taken substantially along the line 4—4 of FIGURE 1 as viewed in the direction indicated by the arrows.
Figure 6:
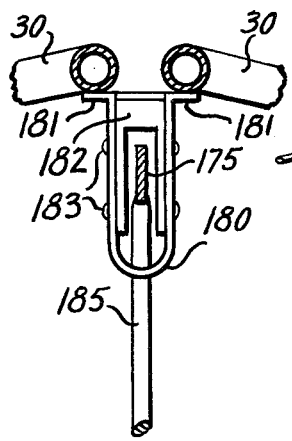
FIGURE 6 is an enlarged sectional view taken substantially along the line 6—6 of FIGURE 4 as viewed in the direction indicated by the arrows.

As best shown in FIGS. 4 and 5, the outer sides of the plate are formed with straight arcuate flanges 142 which are arcuate in cross-section and which partially encircle the diverging rear strut members 32, and complementary straight plates 143 which are also arcuate in cross-section, are positioned on the opposite sides of the members 32, the flanges 142 and the plates 143 being secured together as by means of bolts or rivets 144 which extend through suitable aligned openings in the opposite sides of tubular members 132.

A pair of oppositely disposed rotor blades 150 are suitably attached to the rotor blade mounting arms 131. The rotor blades may be of any desired conventional air foil section, and may be made either in a conventional manner including wood or plastic trailing and leading edges, connected at spaced intervals by the usual ribs, and fabric covered, or may be of hollow, all metal, construction, suitably reinforced, as desired.

At the tips of the rotor blades are provided Coanda type jet units generally indicated at 151, and best shown in FIGS. 13 to 16, inclusive. Each jet unit 151 comprises a tubular body portion 152 having an open forward end 153, and a stabilizing fin 154 aligned with the rotor blade 150. The rear end of the body 152 is also open and it is internally threaded as at 153a for the reception of a tail section 155 having corresponding external threads 155a. A fitting 156 includes a plate 157 which is bolted or riveted as by means of bolts 158 to the inner wall of body 152 adjacent the tip of the rotor blade and an elbow 158a is also open at its inner end and communicates with an opening 160 through the side of the body 152 through which extends a tubular member 161, which comprises a continuation of a tube 162 which extends entirely through the rotor blade and is connected to one of the tubular members 133, permitting uninterrupted passage of air under pressure from the compressor to the rotor tip.

The side of the body 152 adjacent the rotor blade tip is provided with a metallic shoe 163, which conforms in configuration to the cross-sectional area of the rotor blade tip, and in which the end 164 of rotor blade 150 is inserted. The tip is firmly secured in the shoe 163 by means of bolts or rivets 165. A metallic reinforcing strip 166 extends from shoe 163 to the adjacent blade mounting arm 131 along the underside of the blade.

An angularly disposed vertical fin 167 is positioned on top of body 152 to act as a guide fin reducing the effect of centrifugal force on the jet unit. Fins 154 tend to keep the rotor in static balance.

The rear portion of the body 155 is provided with a plurality of spaced vanes 170, which extend interiorly of the tubular member 155 and converge in a ring 171 which surrounds the end of a tube 172 which is fitted into the open end 159 of elbow 156, it being noted that the tube 172 is of materially less diameter than the open end 153 of body 152 or the open rear end of body section 155. The vanes 170 extend exteriorly and rearwardly of the end of tubular section 155, as indicated at 173, and divide the interior of the tube into a plurality, illustratively six, of sections. By virtue of this arrangement a Coanda venturi effect is achieved which results under the well known venturi principle in a multiplication sixfold of the effective square velocity of the air exiting under the extremely high pressure induced by compressor 109 from the tube 172. The equally well known Coanda effect results in maximum differential efficiency of jet thrust. It will thus be seen that from a relatively high pressure in the compressor air is passed directly into the Coanda venturi, where its exhaust effect is multiplied to provide an extremely high degree of thrust in the tip jets 151.

Control of the rotor is effected by tilting the tubular member 128 about its universal ball joint formed with ball 129. This in turn is effected by means of an operating arm 175 which is affixed to a collar 176 which is in turn secured by means of a pin and slot connection 177 to the tubular member 128 immediately below the ball 129. The operating arm 175 extends forwardly through a U-shaped bracket 180 which has as its upper extremity flanges 181 which are suitably secured as by brazing or welding to the underside of frame members 30 adjacent their point of juncture, or immediately above the operator's seat 37. A rubber cushion 182 is bolted as by means of bolts or rivets 183 to the interior of U-shaped bracket 180, and serves as a cushion member for the control arm 175. A cushion member 182 is inverted relative to the bracket 180, and serves also as a limit stop to limit the relative movement of operating arm 175. A control stick 185 having a handle grip 186 is secured to the end of operating arm 175 and extends downwardly to a position where it may be conveniently grasped by the pilot or occupant of the seat 37. The control of the helicopter is effected by forward movement of the handle 186, which tilts the shaft 128 and its associated rotor blade assembly rearwardly, or by moving the same rearwardly to tilt the rotor blade assembly forward to create forward movement of the helicopter, while limited turning movement may be effected by moving the handle 186 to the right or left as desired, such turning movement being sufficient for ordinary control purposes, but supplemented by the rudder and its control through foot pedals 66 and 67. A throttle 187 is mounted in a console 188 for controlling the output of motor 100.

It will thus be seen that complete control of the helicopter may be achieved by means of the operating stick 185, the throttle 187 and the two rudder pedals 66 and 67, the latter two being actually unnecessary to adequate control of the device, since the relative position of the rotor will control all normal forward movement, climb, descent, and banks to the right or left. The throttle control is important only in the initial starting of the device in building of the rotor of the compressor up to the requisite number of revolutions per minute. When the desired pressure in the compressor has been achieved, the device will fly on pressure from the compressor alone, the automatic clutch assembly 105 serving to cut out the motor from the compressor when excessive pressure is achieved therein. When the pressure in the compressor, or the forward speed of the rotor drops below desired limit the clutch will automatically cut in, or, alternatively, the motor may be controlled by the throttle 187.

From the foregoing, it will now be seen that there is herein provides an improved and highly simplified helicopter, which is relatively simple and inexpensive to manufacture, which provides a relatively long range with a minimum of fuel, which may be operated with a minimum of power, which is extremely simple to control and fly, and which may be mastered by anyone ordinarily able to drive a motor car, and which further accomplishes all of the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. In a helicopter, in combination, a frame including spaced longitudinally extending bottom members having arcuate converging upright members secured thereto, a rotor mounting plate secured to said arcuate upright members at the apices thereof, a rotor having a plurality of blades movably mounted on said plate, a motor carried by said frame, an air compressor having an air inlet and an outlet driven by said motor, a tip jet at the end of each rotor blade, a flexible conduit from said outlet to each rotor blade, a tube extending through each blade into the interior of each tip jet, said conduit being connected to said tube, each tip jet comprising a body, open at each end, and a compressed air inlet of lesser diameter than said body positioned interiorly thereof and extending longitudinally of the body forming a Coanda venturi.

2. In a helicopter, in combination, a frame including spaced longitudinally extending bottom members having arcuate converging upright members secured thereto, a rotor mounting plate secured to said arcuate upright members at the apices thereof, a rotor having a plurality of blades movably mounted on said plate, a motor carried by said frame, an air compressor having an air inlet and an outlet driven by said motor, a tip jet at the end of each rotor blade, a flexible conduit from said outlet to each rotor blade, a tube extending through each blade into the interior of each tip jet, said conduit being connected to said tube, each tip jet comprising a body, open at each end, a compressed air inlet of lesser diameter than said body positioned interiorly thereof and extending longitudinally of the body forming a Coanda venturi, and a plurality of radial longitudinally extending vanes in said body dividing the portion of said body rearwardly of said last-mentioned inlet into a plurality of longitudinally extending compartments.

3. In a helicopter, in combination, a frame including spaced longitudinally extending bottom members, transverse members secured to said bottom members in spaced generally parallel relation, arcuate converging upright members secured to said longitudinal bottom members, a rotor mounting plate secured to said arcuate upright members at the apices thereof, a rotor having a plurality of blades movably mounted on said plate, a motor carried by said frame, an air compressor having an air inlet and an outlet driven by said motor, a tip jet at the end of each rotor blade, a flexible conduit from said outlet to each rotor blade, a tube extending through each blade into the interior of each tip jet, said conduit being connected to said tube, control means for tilting said rotor to govern the direction of flight of said helicopter, a boom secured at one end to said frame extending rearwardly from said frame, a rudder carried by said boom at the free end thereof, and means on said frame for controlling said rudder.

4. In a helicopter, in combination, a frame including spaced longitudinally extending bottom members having arcuate converging upright members secured thereto, a rotor mounting plate secured to said arcuate upright members at the apices thereof, a rotor having a plurality of blades movably mounted on said plate, a motor carried by said frame, an air compressor having an air inlet and an outlet driven by said motor, a tip jet at the end of each rotor blade, a flexible conduit from said outlet to each rotor blade, a tube extending through each blade into the interior of each tip jet, said conduit being connected to said tube, control means for tilting said rotor to govern the direction of flight of said helicopter, a boom extending rearwardly from said frame, a rudder carried by said boom, means on said frame for controlling said rudder, said last-mentioned means comprising cables extending in substantially parallel relation from said rudder to said frame, and variable tension means positioned between said parallel cables and in engagement therewith to permit relief of tension on the cables occasioned by stress exerted on said boom.

5. In a helicopter, in combination, a frame including spaced longitudinally extending bottom members having arcuate converging upright members secured thereto, a rotor mounting plate secured to said arcuate upright members at the apices thereof, a rotor having a plurality of blades mounted above said frame, a source of compressed air carried by said frame, a Coanda venturi jet at the end of each rotor blade, a flexible connection extending through said blades from said source of compressed air to said jets, each of said jets comprising a body open at each end, a compressed air inlet of lesser diameter than said body positioned interiorly of and extending longitudinally thereof, the rear of said body being divided by a plurality of longitudinally extending vanes into a plurality of longitudinally extending compartments.

6. In a helicopter, in combination, a frame including a pair of spaced longitudinally extending bottom members having arcuate converging upright members secured thereto, a rotor mounting plate secured to said arcuate upright members at the apices thereof, a rotor having a plurality of blades thereon mounted on said plate and universally movable relative thereto, a source of compressed air carried by said frame, a Coanda venturi jet at the end of each rotor blade, a flexible connection extending through said blades from said source of compressed air to said jets, each of said jets comprising a body open at each end, a compressed air inlet of lesser diameter than said body positioned interiorly of and extending longitudinally thereof, the rear of said body being divided by a plurality of longitudinally extending vanes into a plurality of longitudinally extending compartments, and control means to move said rotor to govern the direction of flight of said helicopter.

7. In a helicopter, in combination, a frame including a pair of spaced longitudinally extending bottom members having arcuate converging upright members secured thereto, a rotor mounting plate secured to said arcuate upright members at the apices thereof, a rotor having a plurality of blades movably mounted on said plate, a source of compressed air carried by said frame, a Coanda venturi jet at the end of each rotor blade, a flexible connection extending through said blades from said source of compressed air to said jets, each of said jets comprising a body open at each end, a compressed air inlet of lesser diameter than said body positioned interiorly of and extending longitudinally thereof, the rear of said body being divided by a plurality of longitudinally extending vanes into a plurality of longitudinally extending compartments, a control means to move said rotor to govern the direction of flight of said helicopter, said control means including a universal mounting cooperatively engaged with said rotor mounting plate and said rotor, a lever extending from said mounting, and an operating handle associated with said lever and extending to a position to be controlled by the operator of the helicopter.

8. In a helicopter, in combination, a frame including a pair of longitudinally extending bottom members having arcuate converging upright members secured thereto, a rotor mounting plate secured to said arcuate upright members at the apices thereof, a rotor having a plurality of blades movably mounted on said plate, a source of compressed air carried by said frame, a Coanda venturi jet at the end of each rotor blade, a flexible connection extending through said blades from said source of compressed air to said jets, each of said jets comprising a body open at each end, a compressed air inlet of lesser diameter than said body positioned interiorly of and extending longitudinally thereof, the rear of said body being divided by a plurality of longitudinally extending vanes into a plurality of longitudinally extending compartments, control means to move said rotor to govern the direction of flight of said helicopter, said control means including a universal mounting cooperatively engaged with said rotor mounting plate and said rotor, a lever extending from said mounting, an operating handle associated with said lever and extending to a position to be controlled by the operator of the helicopter, and a bracket having a resilient internal cushion therein limiting the movement of said lever.

9. The structure of claim 8 wherein a boom is fixed at one end to said frame and extends rearwardly therefrom, a rudder mounted on the free end of said boom, a foraminous floor secured to said frame and having a seat mounted thereon, a control rod extending through said floor, rudder pedals mounted on said control rod above said floor, and rudder control cables operatively connected to said control rod below said floor and to said rudder.

10. The structure of claim 9 wherein said frame includes a pair of longitudinally extending skids on the underside thereof, and landing shoes are positioned on the forward ends of said skids.

11. The structure of claim 10 wherein said landing shoes comprise flat plates having upturned forward ends, rubber cushions carried by the inner sides of said flat plates, and means for securing said shoes to the forward ends of said skids with said rubber plates compressed thereagainst.

References Cited by the Examiner

UNITED STATES PATENTS

| | | | |
|---|---|---|---|
| 2,067,634 | 1/1927 | Hafner | 244—83 |
| 2,644,533 | 7/1953 | Maillard | 170–135.4 X |
| 2,689,011 | 9/1954 | Zakhartchenko | 244—17.19 X |
| 2,719,684 | 10/1955 | Peed | 244—83 |
| 2,868,302 | 1/1959 | Peterson | 170—135.4 |

FOREIGN PATENTS 523,361   4/1956   Canada.

MILTON BUCHLER, *Primary Examiner.*

FERGUS S. MIDDLETON, *Examiner.*